US011856251B1

(12) United States Patent
Roberts et al.

(10) Patent No.: US 11,856,251 B1
(45) Date of Patent: Dec. 26, 2023

(54) SYSTEMS AND METHODS FOR PROVIDING NOTIFICATIONS BASED ON GEOGRAPHIC LOCATION

(71) Applicant: Discovery Communications, LLC, New York, NY (US)

(72) Inventors: Brian F. Roberts, Dallas, TX (US); Chad Peltola, Fairfield, CT (US); Jill Mulligan, Greenwich, CT (US); Charles Robertson, Seattle, WA (US); Kyle Jackson, New York, NY (US); Enrique Florendo, Westlake Village, CO (US)

(73) Assignee: DISCOVERY.COM, LLC, New York, NY (US)

( * ) Notice: Subject to any disclaimer, the term of this patent is extended or adjusted under 35 U.S.C. 154(b) by 0 days.

(21) Appl. No.: 17/936,614

(22) Filed: Sep. 29, 2022

(51) Int. Cl.
*H04N 21/258* (2011.01)
*H04N 21/4788* (2011.01)
*H04N 21/266* (2011.01)

(52) U.S. Cl.
CPC ..... *H04N 21/25841* (2013.01); *H04N 21/266* (2013.01); *H04N 21/4788* (2013.01)

(58) Field of Classification Search
CPC .................. H04N 21/25841; H04N 21/266
See application file for complete search history.

(56) References Cited

U.S. PATENT DOCUMENTS

| | | | | |
|---|---|---|---|---|
| 2003/0007464 A1* | 1/2003 | Balani | ............... | H04L 69/329 705/26.1 |
| 2011/0283322 A1* | 11/2011 | Hamano | ............... | H04N 21/47 725/44 |
| 2012/0246239 A1* | 9/2012 | Rehmann | ............ | G06Q 10/107 709/206 |
| 2012/0290950 A1* | 11/2012 | Rapaport | ............... | H04L 51/52 715/753 |
| 2013/0159883 A1* | 6/2013 | Yerli | ..................... | G06Q 30/02 715/753 |
| 2014/0188590 A1* | 7/2014 | Anguiano | ............ | G06F 3/0425 705/14.35 |
| 2014/0298169 A1* | 10/2014 | Williams | ............... | G06Q 50/10 715/716 |
| 2014/0379469 A1* | 12/2014 | Cipolletta | ........... | H04N 21/482 705/14.53 |

* cited by examiner

*Primary Examiner* — Robert J Hance
(74) *Attorney, Agent, or Firm* — Bookoff McAndrews, PLLC

(57) ABSTRACT

Systems and methods for apprising a user of a proximately located aspect-of-interest are disclosed. One method may include: receiving an indication of a geographic location associated with the user; identifying an aspect associated with a multimedia content interest of the user; determining whether the geographic location associated is within a predetermined distance to a known location the aspect associated with the multimedia content interest; transmitting, responsive to determining that the geographic location is within the predetermined distance to the known location, instructions to a user device associated with the user to provide a notification to the user; receiving, at the server, another indication that the user has provided interaction input to the notification; and transmitting additional instructions to another device to perform an action that is based on the interaction input.

18 Claims, 12 Drawing Sheets

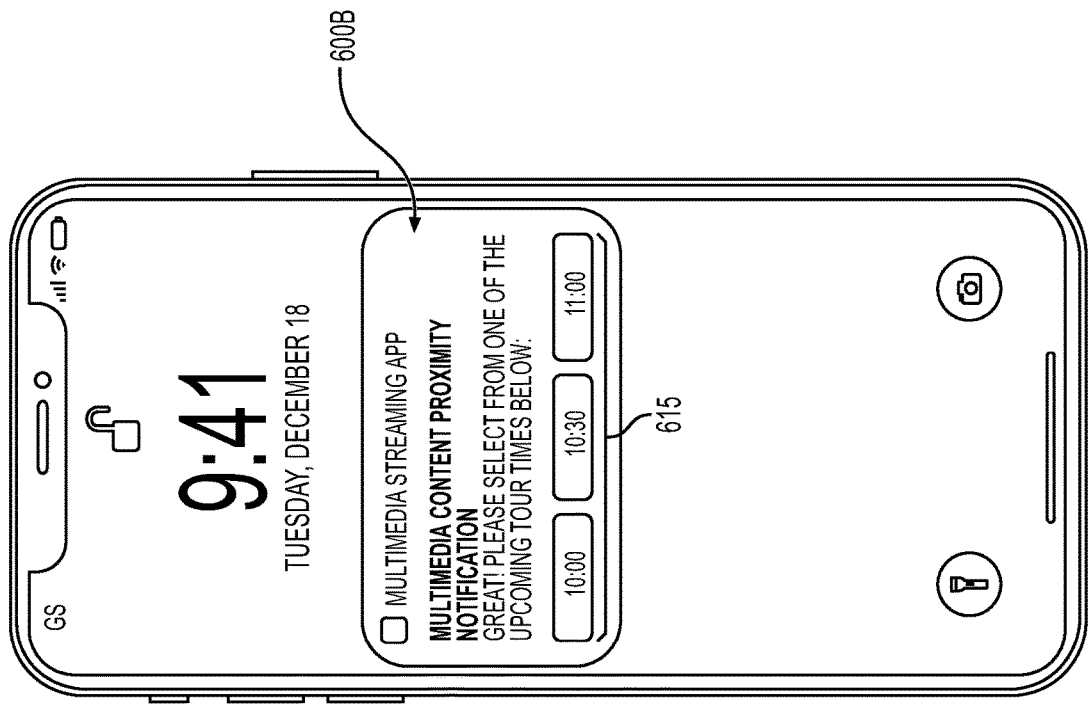
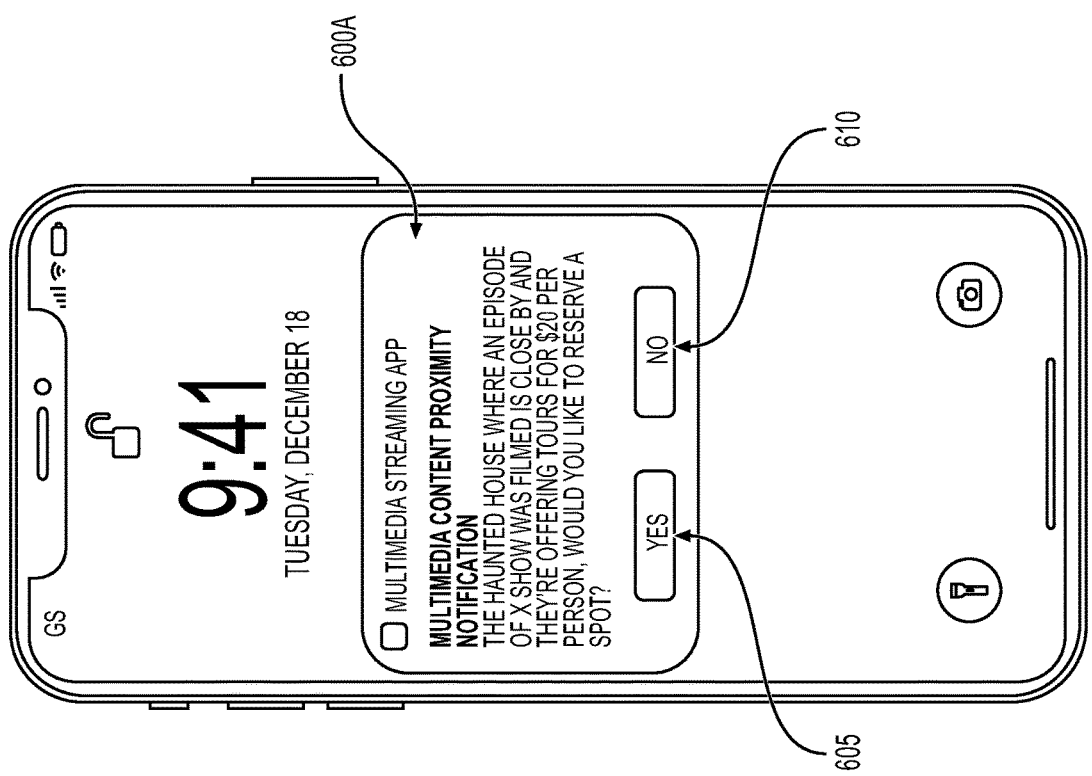
FIG. 6B
FIG. 6A

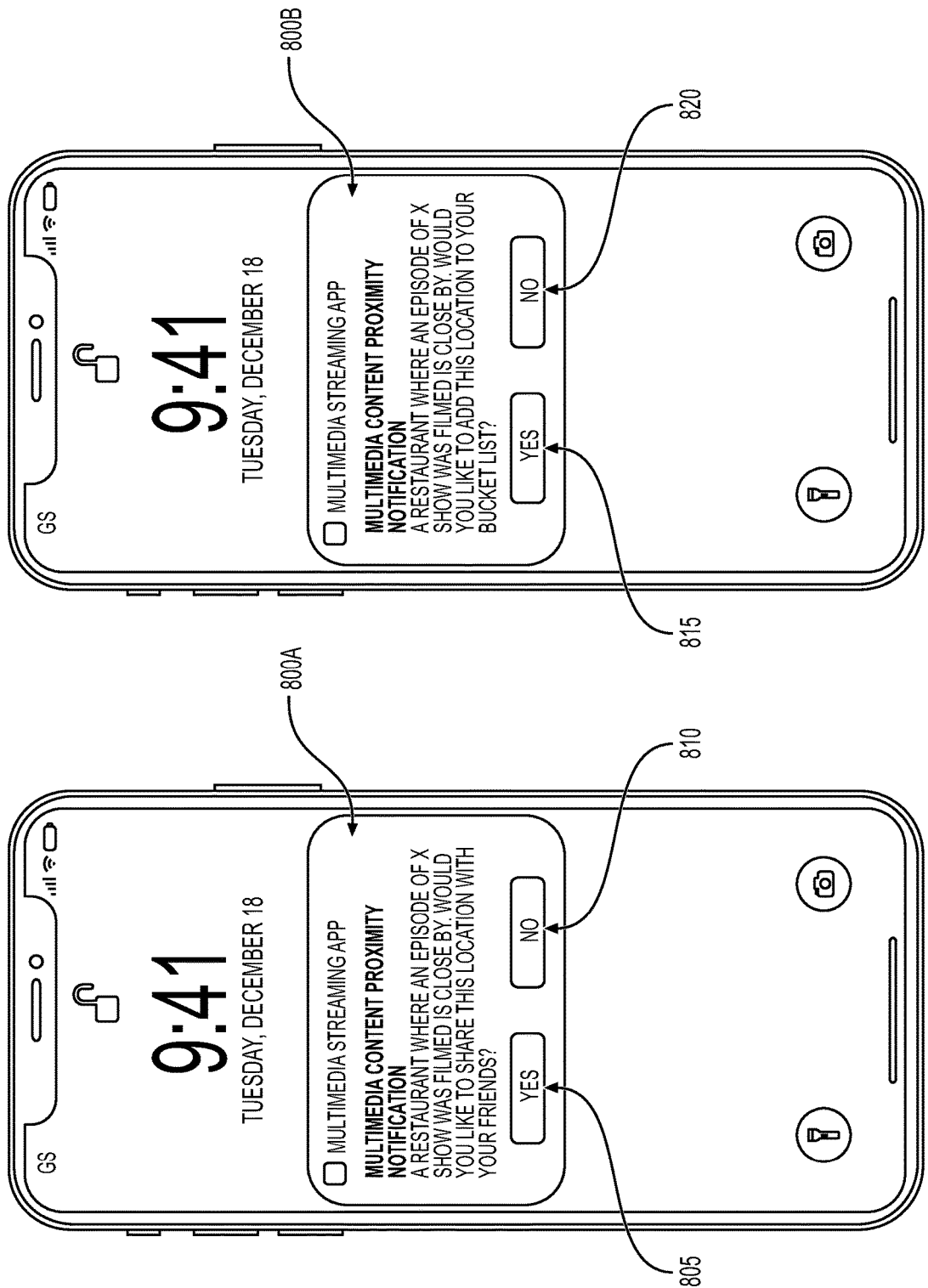

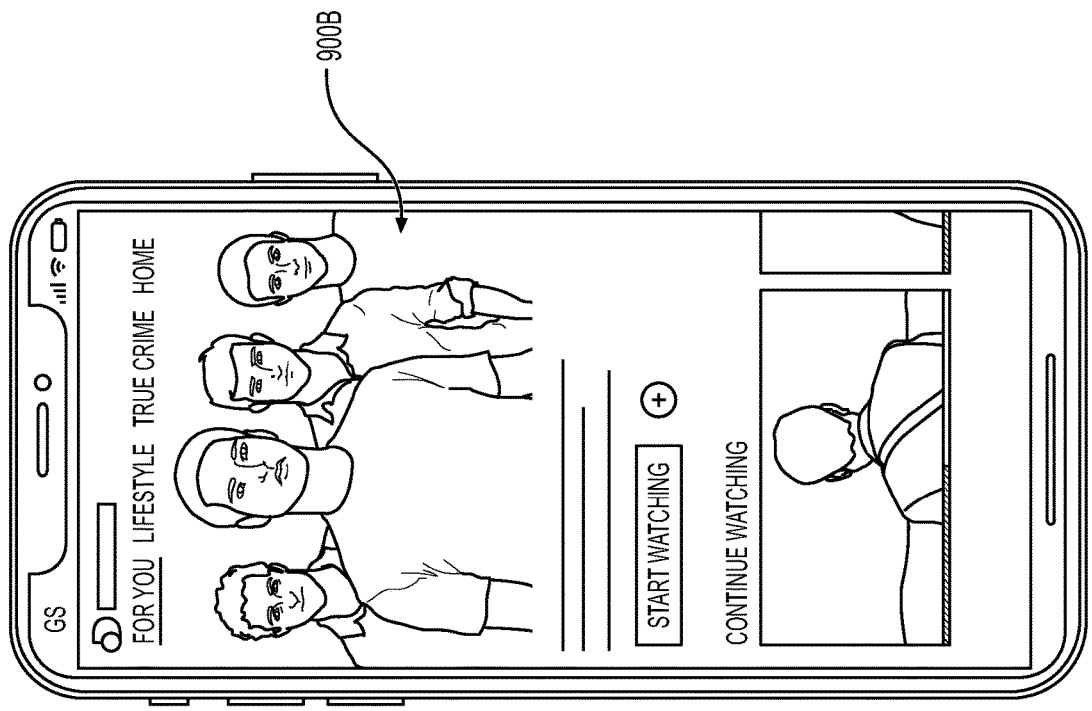
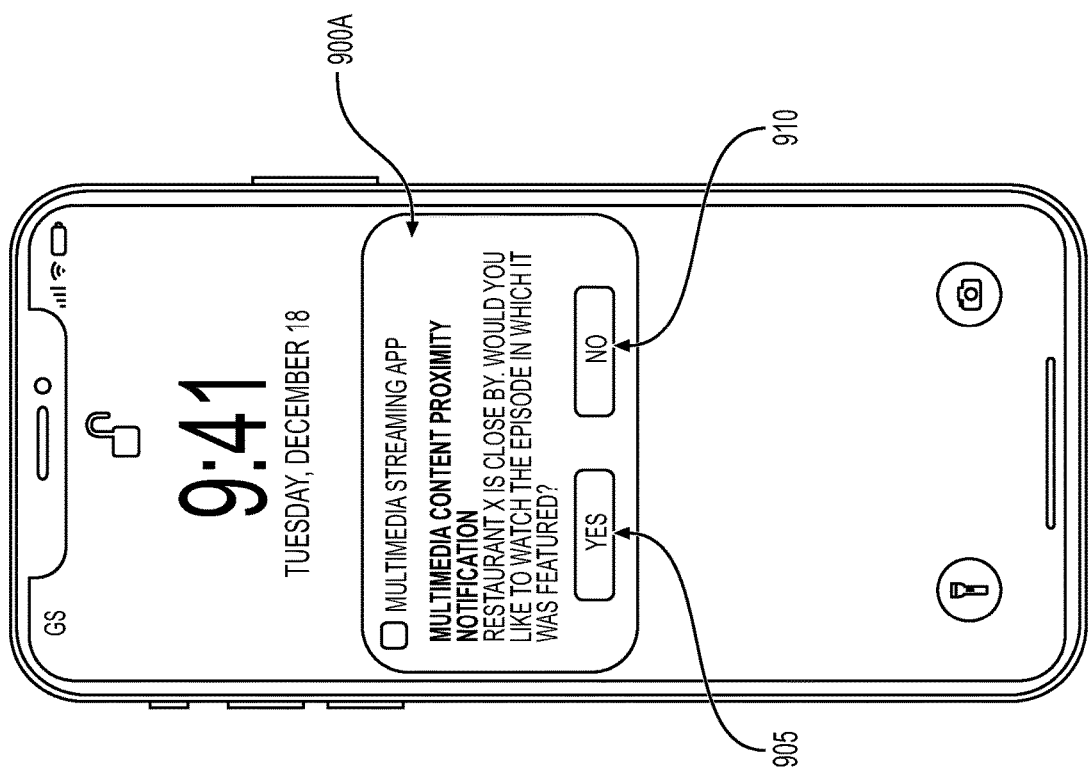
FIG. 9B
FIG. 9A

SYSTEMS AND METHODS FOR PROVIDING NOTIFICATIONS BASED ON GEOGRAPHIC LOCATION

TECHNICAL FIELD

Various embodiments of the present disclosure relate generally to the field of device notification provision, and, more particularly, to providing notifications and other output related to a geographic location associated with a user.

BACKGROUND

Subscription-based video streaming platforms provide individuals with a vast array of multimedia content (e.g., movies, television shows, documentaries, etc.) to consume on their information handling devices, e.g., smart phones, tablets, laptops and/or personal computers, televisions, and the like. In many instances, the multimedia content is not produced in a single location, but rather, may be created in, or associated with, a variety of different geographic locations. Individuals that are visiting or that are located in proximity to these geographic locations may be interested in being apprised of various types of information associated with their favorite articles of multimedia content. The present disclosure is accordingly directed to notifying individuals about opportunities to explore additional aspects of their favorite multimedia content based on their geographic location.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for enabling dynamic notification provision based at least in part on knowledge of a user's geographic location.

In one aspect, a computer-implemented method for apprising a user of a proximately located aspect-of-interest using a server in network communication with at least one database is disclosed, the computer-implemented method comprising operations including: receiving, at the server, an indication of a geographic location associated with the user; identifying, via accessing the at least one database, one or more aspects associated with a multimedia content interest of the user; determining, using the at least one processor, whether the geographic location associated with the user is within a predetermined distance to a known location for at least one aspect of the one or more aspects associated with the multimedia content interest; transmitting, responsive to determining that the geographic location associated with the user is within the predetermined distance to the known location for the at least one aspect of the one or more aspects associated with the multimedia content interest, instructions to a user device associated with the user to provide a notification to the user; receiving, at the server, another indication that the user has provided interaction input to the notification; and transmitting, by the server, additional instructions to another device to perform an action that is based on the interaction input.

In another aspect, a system for apprising a user of a proximately located aspect-of-interest is disclosed, the system comprising: at least on processor; at least one database; and a server in network communication with the at least one database, the server configured to perform operations including: receiving, at the server, an indication of a geographic location associated with the user; identifying, via accessing the at least one database, one or more aspects associated with a multimedia content interest of the user; determining, using the at least one processor, whether the geographic location associated with the user is within a predetermined distance to a known location for at least one aspect of the one or more aspects associated with the multimedia content interest; transmitting, responsive to determining that the geographic location associated with the user is within the predetermined distance to the known location for the at least one aspect of the one or more aspects associated with the multimedia content interest, instructions to a user device associated with the user to provide a notification to the user; receiving, at the server, another indication that the user has provided interaction input to the notification; and transmitting, by the server, additional instructions to another device to perform an action that is based on the interaction input.

In yet another aspect, a non-transitory computer-readable medium storing computer-executable instructions which, when executed by a server in network communication with at least one database, cause the server to perform operations comprising: receiving, at the server, an indication of a geographic location associated with the user; identifying, via accessing the at least one database, one or more aspects associated with a multimedia content interest of the user; determining, using the at least one processor, whether the geographic location associated with the user is within a predetermined distance to a known location for at least one aspect of the one or more aspects associated with the multimedia content interest; transmitting, responsive to determining that the geographic location associated with the user is within the predetermined distance to the known location for the at least one aspect of the one or more aspects associated with the multimedia content interest, instructions to a user device associated with the user to provide a notification to the user; receiving, at the server, another indication that the user has provided interaction input to the notification; and transmitting, by the server, additional instructions to another device to perform an action that is based on the interaction input.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 6(A-B) depicts exemplary push notifications and interactions therewith, according to one or more embodiments.

FIG. 8(A-B) depicts exemplary push notifications and interactions therewith, according to one or more embodiments.

FIG. 9(A-B) depicts exemplary push notifications and interactions therewith, according to one or more embodiments.

DETAILED DESCRIPTION OF EMBODIMENTS

Figure 1:
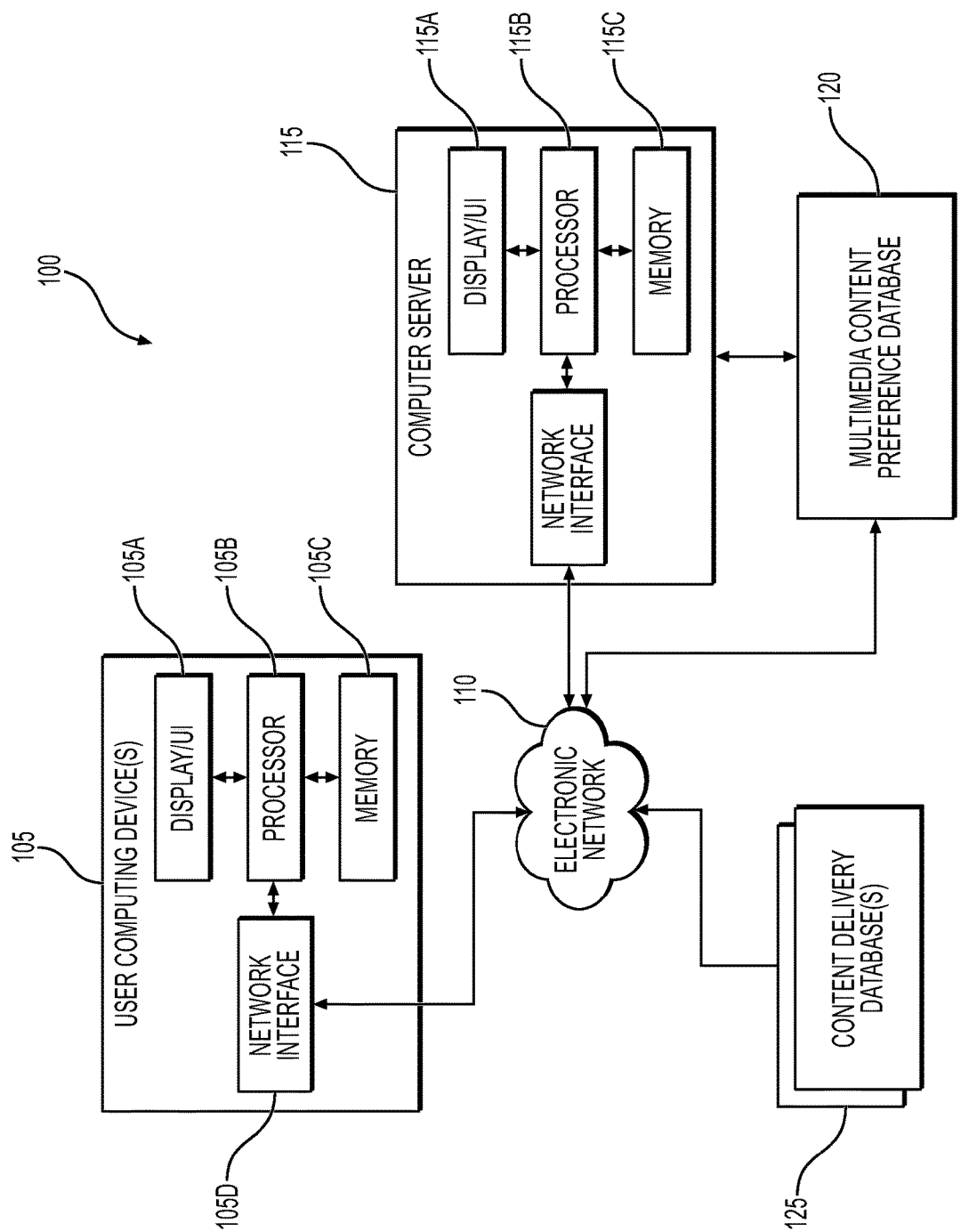
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The term "user", "subscriber," and the like generally encompasses consumers who are subscribed to a streaming service (e.g., streaming platform) associated with the system described herein. The term "streaming service" (e.g., streaming platform) may refer to subscription-based video-on-demand (SVoD) services such as television shows, films, documentaries, and the like. The term "user" may be used interchangeably with "user profile," "profile," and the like throughout this application. The phrase "registered with" may be used interchangeably with "subscribed to" and the like throughout this application. The phrase "multimedia content" may be used interchangeably with "multimedia content item", "article of multimedia content", and the like throughout this application.

In the following description, embodiments will be described with reference to the accompanying drawings. As will be discussed in more detail below, in various embodiments, systems and methods for providing dynamic, location-based notifications to a user are described.

Multimedia content may be produced in different geographic locations around the world. For example, reality shows (e.g., travel shows, food-based review shows, home makeover shows, other types of reality shows, etc.), documentaries, sports broadcasts, music videos, and the like may all be produced on-location in a variety of different areas. Individuals may be interested in visiting or seeing the real-world places and/or things (e.g., cities, towns, structures, objects, establishments, etc.) associated with their favorite shows. However, many individuals may not know exactly where these show-affiliated objects or places are located. Additionally or alternatively, traveling individuals may not be aware that they are at, or in proximity to, one or more of these show-affiliated objects or places. Consequently, these individuals may miss out on an opportunity to have a unique experience.

An individual suspecting that an object or place is affiliated with one of their favorite articles of multimedia content may utilize their device to research information on it (e.g., via searching on a web browser, contacting a friend, etc.). However, such a process may be time-consuming, burdensome, and may not always be feasible (e.g., in situations where an individual is busy and/or has their attention preoccupied by another matter, etc.). Furthermore, in situations where an individual is proximate to, but unaware of, a show-affiliated object or place, no conventional solution exists for them to be apprised of this fact.

To address the above-noted problems, the present disclosure describes a system that can dynamically apprise users of objects and/or places of interest to them based upon knowledge of their viewing interests and on their geographic location. More particularly, the system may obtain data related to an individual's interests (e.g., their favorite or most frequently watched shows and/or episodes, etc.). The system may then identify aspects associated with each of those interests (e.g., where each episode of the show was filmed, what prominent buildings or objects were featured in each episode, the identities of the actors/cast in the show, etc.). Thereafter, upon determining that an individual's geographic location is proximate to one or more aspects associated with their interests, the system may provide a notification to the individual (e.g., informing them of this determination, etc.).

Although the subject matter disclosed herein is generally described with reference to a user's favorite articles of multimedia content, it is important to note that these designations are not limiting. More particularly, some or all of the embodiments that are subsequently described may be applicable to other areas of user interest (e.g., art, books, nature, etc.).

FIG. 1 depicts an exemplary block diagram of a system environment 100 configured to provide dynamic notifications to users, according to one or more embodiments of the present disclosure. The system environment 100 may include a user computing device 105 operated by a user, an electronic network 110, a computer server 115, a multimedia content preference database 120, and one or more content delivery databases 125.

The user computing device 105, the server 115, the multimedia content preference database 120 and/or the content delivery databases 125 may be connected via the network 110, using one or more standard communication protocols. The server 115 may be configured to receive data over the network 110 from the user computing device 105, including, but is not limited to, user-provided multimedia content preference data and device-based location data. "Multimedia content preference data" includes data received from the user computing device 105 as well as data generated and analyzed by the computer server 115. The multimedia content preference data may be stored in the multimedia content preference database 120, and may include information as to a favorited article of multimedia content to by user, a recently viewed article of multimedia content by the user, a frequently viewed article of multimedia content by the user, a friend-suggested article of multimedia content, and crowdsourced indications of popular articles of multimedia content. The server 115 may store the multimedia content preference data received over the network 110 in the multimedia content preference database 120.

In one or more embodiments, the computer server 115 and the multimedia content preference database 120 may be one server computer device and a single database, respectively. Alternatively, in one or more embodiments, the server 115 may be a server cluster, or any other collection or network of a plurality of computer servers. The multimedia content preference database 120 also may be a collection of a plurality of interconnected databases. The server 115 and the multimedia content preference database 120 may be components of one server system. Additionally, or alternatively, the server 115 and the multimedia content preference database 120 may be components of different server systems, with the network 110 serving as the communication channel between them. The computer server 115, the multimedia content preference database 120, and/or the content delivery databases 125 may be associated with an entity 130, such as a subscription-based streaming service provider (not shown). In some embodiments, the computer server 115, the multimedia content preference database 120, and/or the content delivery databases 125 may collectively be referred to as an entity system.

As shown in FIG. 1, the computer server 115 may be in communication with the user device 105 to transmit and receive data, messages, and/or instructions from each other across the network 110. The user device 105 may be associated with users who are subscribed to a streaming service platform provided by the computer server 115. The network 110 may comprise one or more networks that connect devices and/or components of environment 100 to allow communication between the user device 105, the computer server 115, and other associated components. For example, the network 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of environment 100. In some embodiments, the network 110 may be implemented using cell and/or pager networks, satellite, licensed radio, or a combination of licensed and unlicensed radio. The network 110 may be associated with a cloud platform that stores data and information related to methods disclosed herein.

The user computing device 105 may include a display/user interface (UI) 105A, a processor 105B, a memory 105C, and/or a network interface 105D. The user computing device 105 may be a personal computer (PC), a tablet PC, a set-top box (STB), a streaming device (e.g., Apple TV®, Amazon Fire®, Roku® player, Google Chromecast®), a television (TV), a smart TV, a gaming console, a personal digital assistant (PDA), a mobile device, a palmtop computer, a laptop computer, a desktop computer, etc. The user computing device 105 may execute, by the processor 105B, an operating system (O/S) and at least one application (each stored in memory 105C). The application may be a browser program or a mobile application program (which may also be a browser program in a mobile O/S). The application may generate one or more interactive push notifications, such as, for example, the exemplary push notifications shown in FIGS. 3-7, based on instructions/information received from the server 115. In some embodiments, the application may generate one or more interactive push notifications based on instructions/information stored in the memory 105C. The interactive push notifications may be application GUIs for the application executed based on XML and Android programming languages or Objective-C/Swift, but one skilled in the art would recognize that this may be accomplished by other methods, such as webpages executed based on HTML, CSS, and/or scripts, such as JavaScript. The display/UI 105A may be a touch screen or a display with other input systems (e.g., mouse, keyboard, etc.). The network interface 105D may be a TCP/IP network interface for, e.g., Ethernet or wireless communications with the network 110. The processor 105B, while executing the application, may receive user inputs from the display/UI 105A, and perform actions or functions in accordance with the application or other related applications.

The computer server 115 may include a display/UI 115A, a processor 115B, a memory 115C, and/or a network interface 115D. The server 115 may be a computer, system of computers (e.g., rack server(s)), and/or or a cloud service computer system. The server 115 may execute, by the processor 115B, an operating system (O/S) and at least one instance of a server program (each stored in memory 115C). The server 115 may store or have access to information from interaction database 120 and content delivery databases 125. The display/UI 115A may be a touch screen or a display with other input systems (e.g., mouse, keyboard, etc.) for an operator of the server 115 to control the functions of the server 115 (e.g., update the server program and/or the server information). The network interface 115D may be a TCP/IP network interface for, e.g., Ethernet or wireless communications with the network 110. The server program, executed by the processor 115B on the server 115, may be configured to identify interaction partners that align with a user's mission(s) of interest, as will be described in further detail below.

As described above, the computer server 115 may store data associated with users subscribed to a streaming service platform associated with the computer server 115. For instance, the computer sever 115 may store user profiles generated by the computer server 115 for the user. In some embodiments, the information described above, including the multimedia content preference data and any additional data received from user computing devices 105, may be stored in a plurality of user profiles within the interaction database 120. Each user profile may correspond to a specific user in communication with the server 115. In an embodiment, a user may have multiple user computing devices 105 registered with the server 115 based on the user's viewing habits and/or preferences. For example, one user may register a personal laptop, a smart TV, and a mobile device with the server 115. Information associated with registered user computing device(s) 105 and the user's viewing habits and/or viewing preferences may all be stored within the user's user profile.

In some embodiments, in addition to the interaction data, each user profile may also include information associated with a respective user and their user computing device(s) 105 (e.g., a device identifier, device type), the user's name, a username or a nickname provided by the user for the user profile, content viewing preferences provided by the user, recommendations provided to the user by the computer server 115, the user's past viewing activity, IP addresses and locations (as well as accompanying dates and times) from where the user has logged in from, and/or user analytics generated by the server 115. In these embodiments, the user profile may be updated to reflect a corresponding user's recent activities and locations.

In the system environment 100, the computer server 115, in association with a multimedia streaming platform, may retrieve multimedia content requested by users from the content delivery databases 125 to enable requested content to be streamed by users on the user computing device 105. The content delivery database 125 may store volumes of multimedia content items, including, for example, video series, movies, documentaries, and additional programming content that may be streamed by users 102 on the user computing devices 105. In some embodiments, the content delivery databases 125 may be maintained by third party content providers. In other embodiments, the content delivery databases 125 may be maintained by the server 115 and/or additional servers associated with the server 115. In an embodiment, the computer server 115 may analyze the articles of multimedia content stored in the content delivery database(s) 125 in order to glean various aspects associated with those articles (e.g., filming location, structures featured in the article, characters/actors/individuals featured in the articles, etc.).

In some embodiments, the computer server 115 may also store additional data received from user computing device 105, including real time and/or near real time location data (e.g., GPS data) of the user computing device 105. Based on knowledge of this location data, the computer server 115 may access information stored in the multimedia content preference database 120 to identify correlations between aspects of articles of multimedia content stored in the multimedia content preference database 120 and a user's current location. The computer server 115 may then transmit instructions, via the network 110, to the user computing device to display a notification informing the user of these correlations. In some embodiments, the computer server 115 may further facilitate access to third party websites or services responsive to user interactions with these notifications (e.g., selections to order a ride from a ridesharing service, selections to go to a business's website, etc.).

Figure 2:
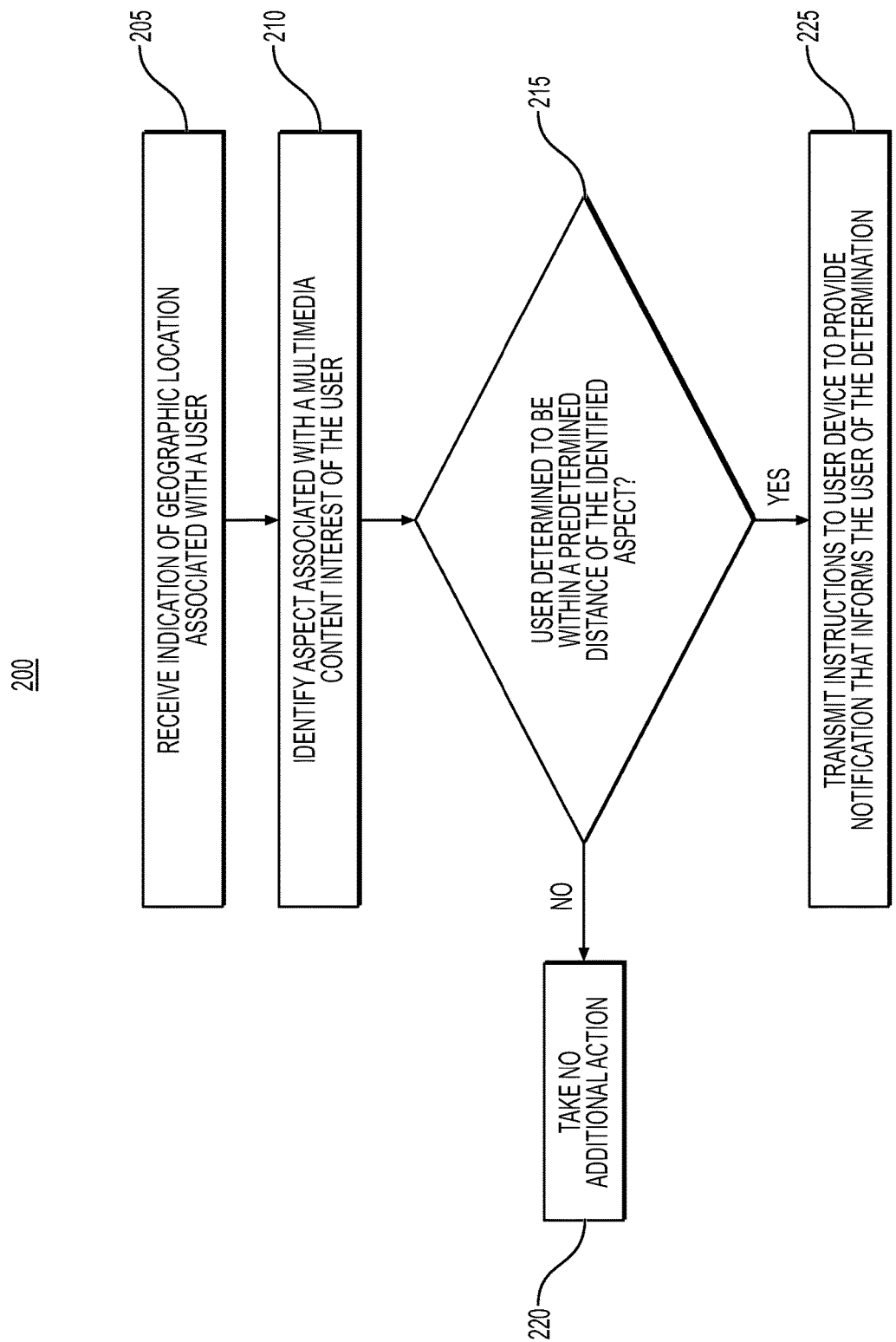
FIG. 2 depicts an exemplary flowchart of a method of providing a notification to a user of a proximate multimedia content interest, according to one or more embodiments.

FIG. 2 depicts an exemplary process flow 200 for apprising users that they are in proximity to multimedia-based objects and/or locations of interest, according to one or more embodiments of the present disclosure. The exemplary process flow 200 may be implemented by system environment 100, which includes user computing device 105 associated with users, computer server 115, multimedia content preference database 120, and content delivery databases 125 (all shown in FIG. 1).

At step 205, an indication of a user's geographic location may be received at the computer server 115. In the context of this application, the user's geographic location may correspond to virtually any physical position located in the real world. In an embodiment, the geographic location of the user may be deduced from location data associated with a user's computing device 105. More particularly, the computer server 115 may assume that the user's geographic position is substantially equivalent to the geographic position of their computing device 105. In an embodiment, geographic location data may be received from the computing device 105 (e.g., substantially continuously, at predetermined intervals, etc.), which may be derived from one or more location-aware technologies including, but not limited to, GPS, Wi-Fi triangulation, Enhanced Observed time Difference (E-OTD), and the like. Additionally or alternatively, in another embodiment, the geographic location of the user may be deduced from receipt of location-based context data associated with the user. More particularly, the computer server 115, given appropriate permissions, may be capable of accessing one or more of a user's calendar data (e.g., containing stored indications of designated locations a user will be located), communication data (e.g., emails, SMS messages, online chat data, etc.), and/or social media data (e.g., status updates, public posts, etc.).

At step 210, an aspect associated with a multimedia content interest of the user may be identified. In the context of this application, a multimedia content interest of the user may correspond to one or more of: a favorited article of multimedia content (e.g., a show, a film, a documentary, etc.), a recently viewed article of multimedia content (e.g., within the past day, week, month, etc.), a frequently viewed article of multimedia content (e.g., a show or film that the user has viewed more than a predetermined number of times (e.g., 3 or more times, etc.) within a designated time period (e.g., a week, a month, a year, etc.)), a friend-suggested article of multimedia content, and/or a popular article of multimedia content (e.g., an article of multimedia content that has been viewed by many users of a multimedia streaming platform through which the multimedia content is viewed). In the context of this application, an aspect associated with the multimedia content interest may be one or more of: a location wherein the article of multimedia content was filmed (e.g., country, state, city, town, etc.), a building that the article of multimedia content was filmed in (e.g., a business, a restaurant, etc.), an event featured or mentioned in the article of multimedia content (e.g., a national or religious holiday/celebration, etc.), a structure featured or mentioned in the article of multimedia content (e.g., a statue, a bridge, etc.), an object featured or mentioned in the article of multimedia content (e.g., a tool, a toy, a food item, virtually any other type of object, etc.), a person that was associated with the article of multimedia content (e.g., an actor or individual that appeared in the article of multimedia content, a director, writer, or producer of the article of multimedia content, etc.), other individuals that may be similarly interested in in the multimedia content interest, and the like.

The identification of the aspect may be facilitated by the computer server 115 in one or more ways. For instance, in one embodiment, the computer server 115 may leverage one or more image and/or video processing technologies to analyze the presented content of an article of multimedia content and determine the various aspects associated with it. For example, scene-by-scene analysis may be conducted to identify the locations, buildings, and/or activities featured in an article of multimedia content. Additionally or alternatively, in another embodiment, each article of multimedia content may have metadata attached that identifies one or more different aspects associated with it (e.g., the individuals that appear in a show, the location where the events of the show occur, etc.).

At step 215, an embodiment may determine whether the geographic location associated with the user is within a predetermined distance of a known location of an identified aspect of a multimedia content interest. In the context of this application, the "predetermined distance" may be considered by the computer server 115 to be a distance from a user that is reasonably proximate to an object or location of interest. In an embodiment, this determination may be facilitated by identifying the difference between the user's geographic location and the location of the identified aspect and thereafter comparing this difference to the predetermined threshold. In an embodiment, the predetermined distance may be originally set by a manufacturer or programmer of the multimedia streaming platform and/or may later be adjusted by a user.

In an embodiment, the predetermined distance threshold may either be static or dynamic. More particularly, with respect to the former, the predetermined distance may remain constant for all situations (e.g., the predetermined distance threshold may be set at 5 miles for each determination proceeding). Conversely, with respect to the latter, the predetermined distance may dynamically vary based upon one or more contextual parameters that are known to the computer server 115. For instance, a distance of 5 miles in a rural or suburban area may be considered "close" to the user (and thereby considered to be within the "predetermined distance") whereas a distance of 5 miles in an urban area may be considered to be far away from the user (i.e., because traveling between two geographic points in a city generally takes longer than traveling the same distance in a rural or suburban area). The computer server's 115 knowledge and consideration of other factors may also affect the dynamic predetermined distance threshold. For instance, the computer server 115 may consider other factors that may affect a user's ability to travel between locations (e.g., a user's available travel means, a user's financial situation, whether or not the user has a disability, etc.).

Responsive to determining, at step 215, that the geographic location associated with the user is not within the predetermined distance of the known location of an aspect of a multimedia content interest, an embodiment may, at step 220, take no additional action. Conversely, responsive to determining, at step 215, that the geographic location associated with the user is within the predetermined distance of the known location of an aspect of a multimedia content interest, an embodiment may, at step 225, transmit instructions to the user device 105 to provide a notification to the user. In an embodiment, the notification may be an audible notification, a visual notification, a combination thereof, and the like. For simplicity purposes, the remainder of the disclosure is described with reference to a visual push notification that is presented on a display screen of the user device 105.

The notification may be structured in a variety of different ways, may contain a variety of different types of information, and may have varying functionality associated with it. A multitude of exemplary notification types are further described herein with reference to FIGS. 3-4. Exemplary notifications 300-400 may be generated by the computer server 115 for display on the user device 105.

Turning now to FIG. 3(A-D), a plurality of informative notifications 300(A-D) may be presented to the user and inform them of the determination result. In the context of this application, an informative notification may provide an indication to the user that an aspect associated with a multimedia content interest is located close to their geographic location. Non-limiting types of information that may be presented in these informative notifications include: distance information to an aspect, direction information to an aspect, travel time information to an aspect, pricing information associated with the aspect, filming information associated with the aspect (e.g., is filming currently ongoing or not, etc.), availability information associated with the aspect (e.g., is the aspect currently open for visitation, etc.), a combination thereof, and the like. It is important to note that the foregoing list of information that may be contained in the notification is non-limiting and other information, not explicitly described here, may also be contained in the informative notifications.

Figure 3B:
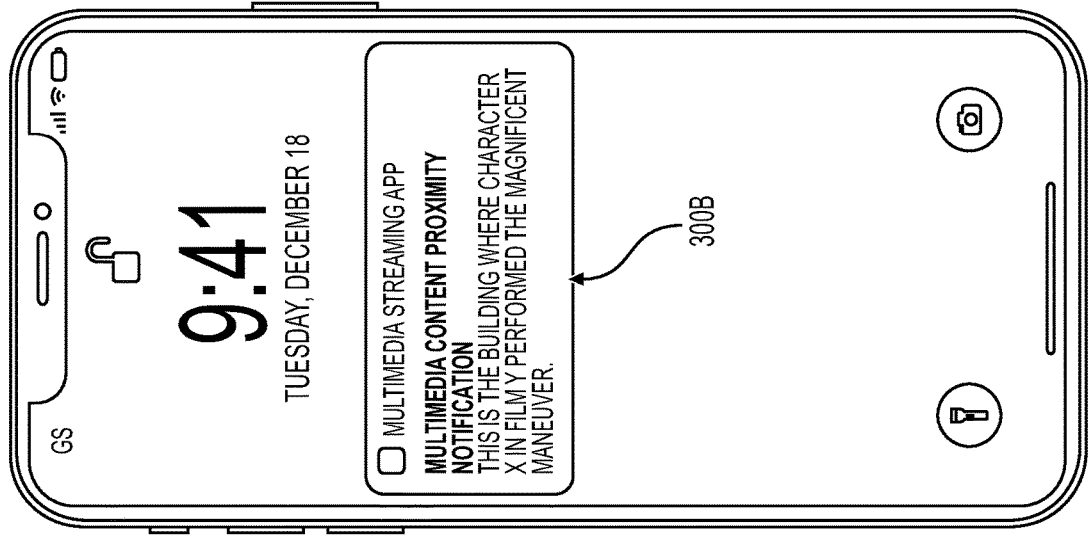
FIG. 3(A-D) depicts exemplary push notifications, according to one or more embodiments.
Figure 3A:
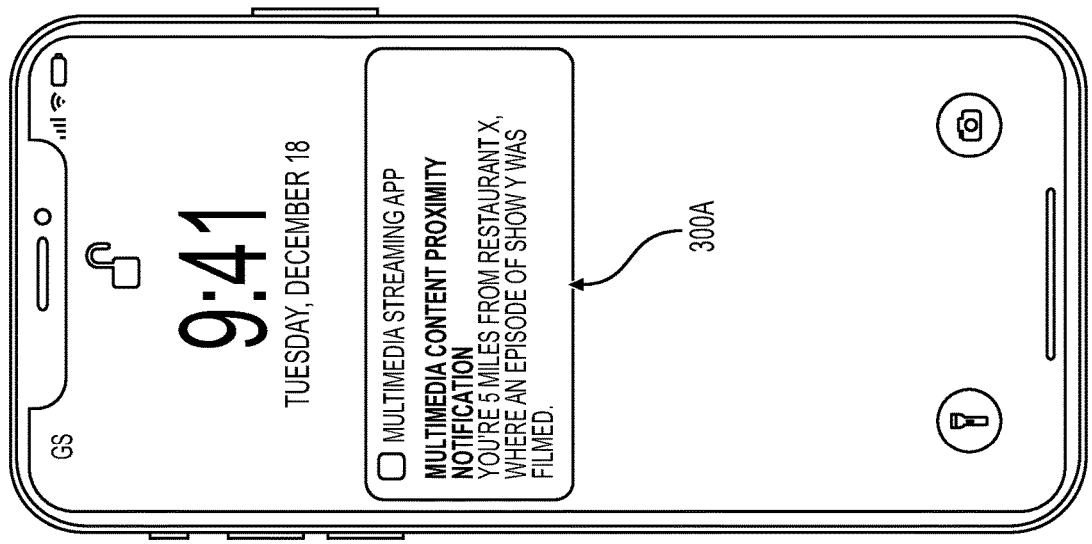
Figure 3C:
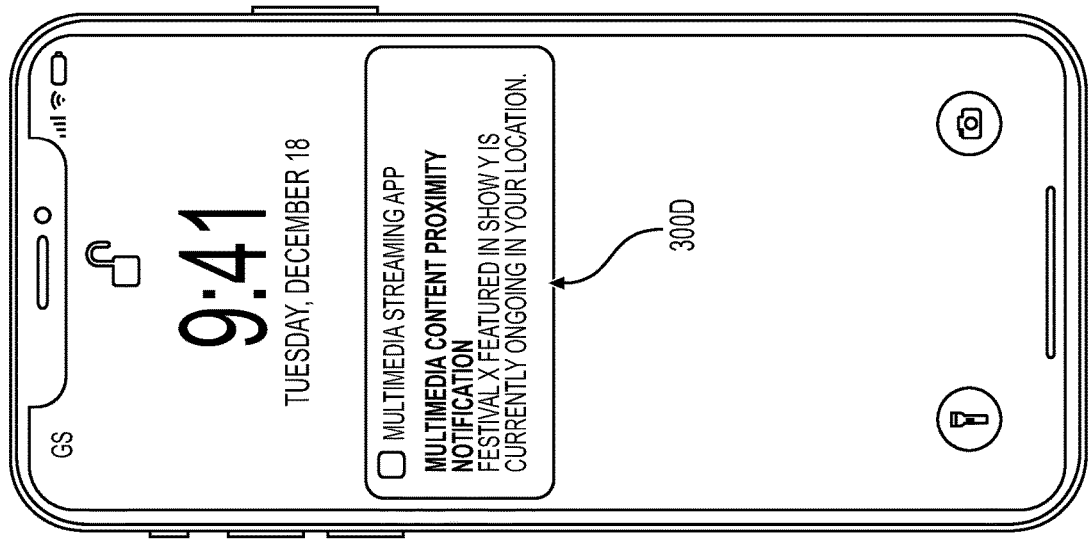
Figure 3D:
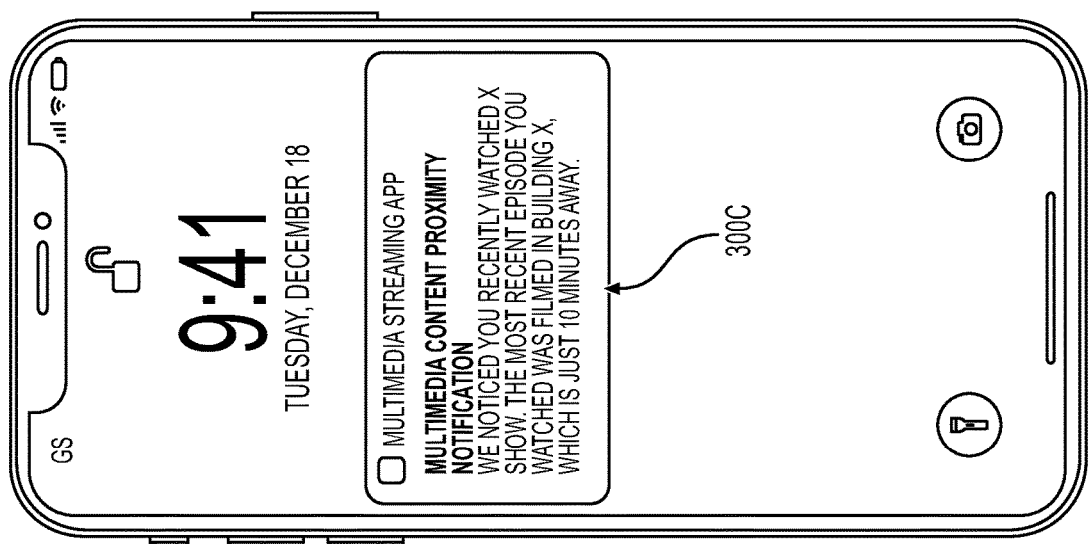

As an illustrative example of the foregoing, notification 300A in FIG. 3A may provide an indication that a restaurant that was featured in an episode of a show that a user watched is located 5 miles away. In another example, notification 300B in FIG. 3B may provide an indication that a character featured in a film the user previously viewed had performed a specific activity in a building that the user is currently located in. In yet another example, notification 300C in FIG. 3C may provide an identification of a show that the user recently watched and further provide an indication that an aspect of that show (e.g., a building where events in the show occurred) is located close to the user (e.g., 10 minutes away, etc.). In yet another example, notification 300D in FIG. 3D may provide an indication that a festival that was featured in a show that the user had watched is currently occurring in the user's geographic location.

Figure 4B:
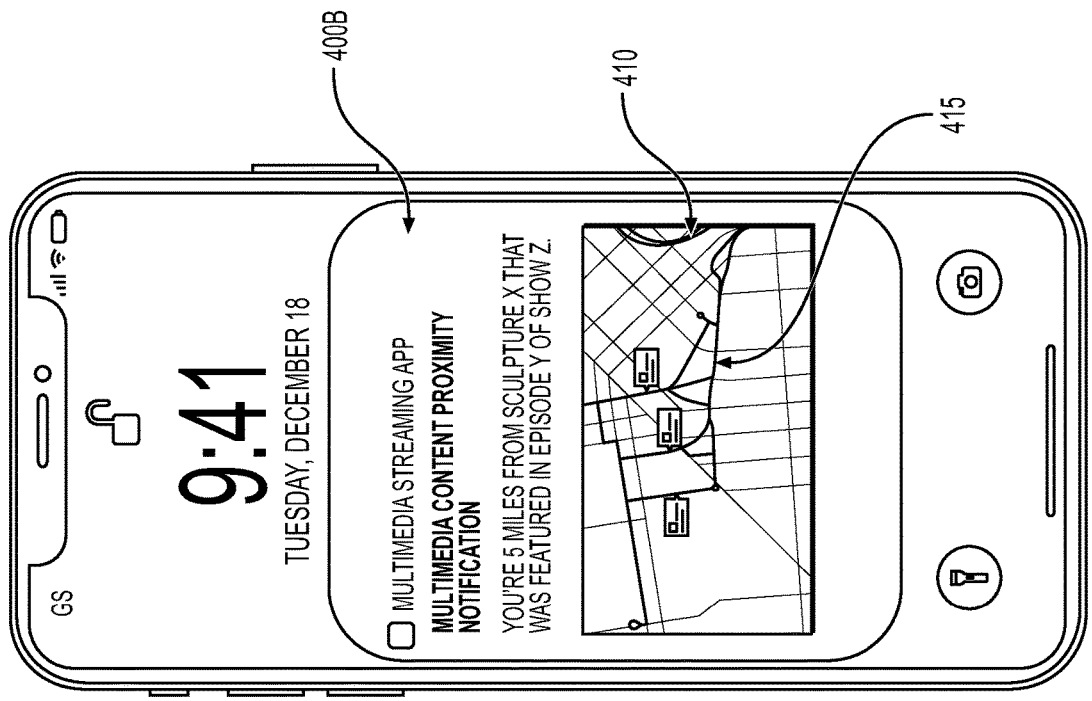
FIG. 4(A-B) depicts exemplary push notifications, according to one or more embodiments.
Figure 4A:
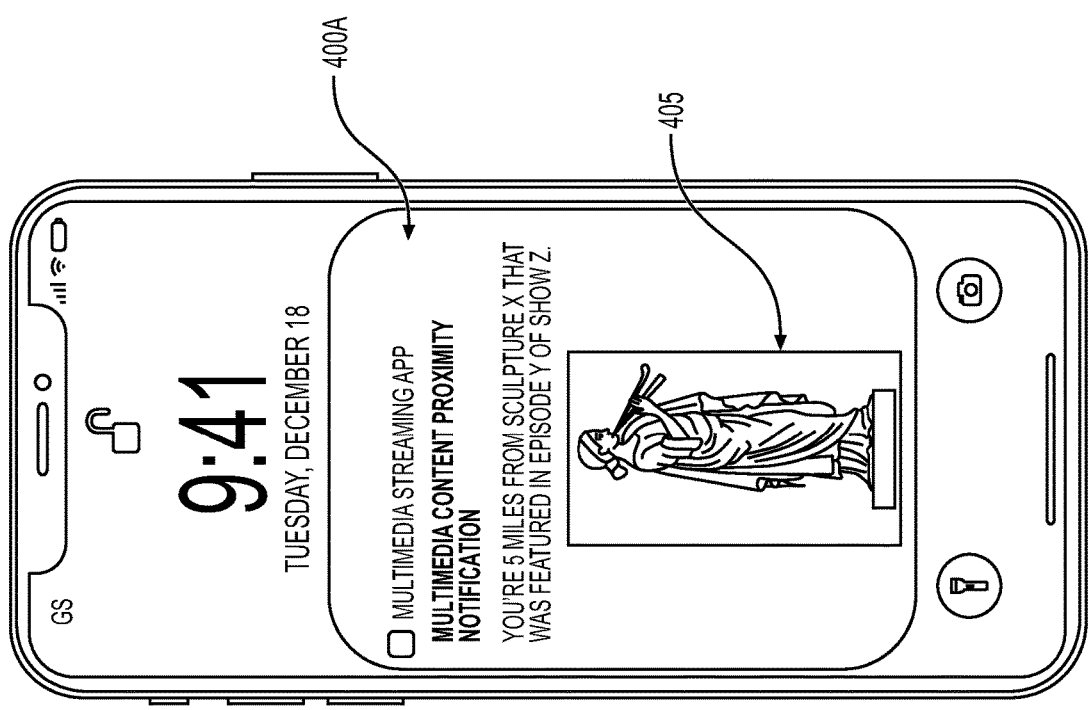

Turning now to FIG. 4(A-D), additional types of informative notifications 400(A-B) that contain certain graphic characteristics may be presented to the user. For example, notification 400A in FIG. 4A may contain an indication that the user is located 5 miles away from a particular sculpture that was featured in an episode of a show they recently watched. Additionally, notification 400A may further contain an image of the sculpture 405 that was featured in the episode. The image of the sculpture 405 may be a screenshot of a frame of the episode in which the sculpture was presented or, alternatively, may be an image that was pulled from the computer server 115 from another location (e.g., an online source, etc.). In another example, notification 400B in FIG. 4B may also contain an indication that the user is located 5 miles away from a particular sculpture that was featured in an episode of a show they recently watched. Additionally, notification 400B may further contain a map diagram 410 with highlighted directions 415 that illustrates how to get to the sculpture from the user's geographic location.

Figure 5:
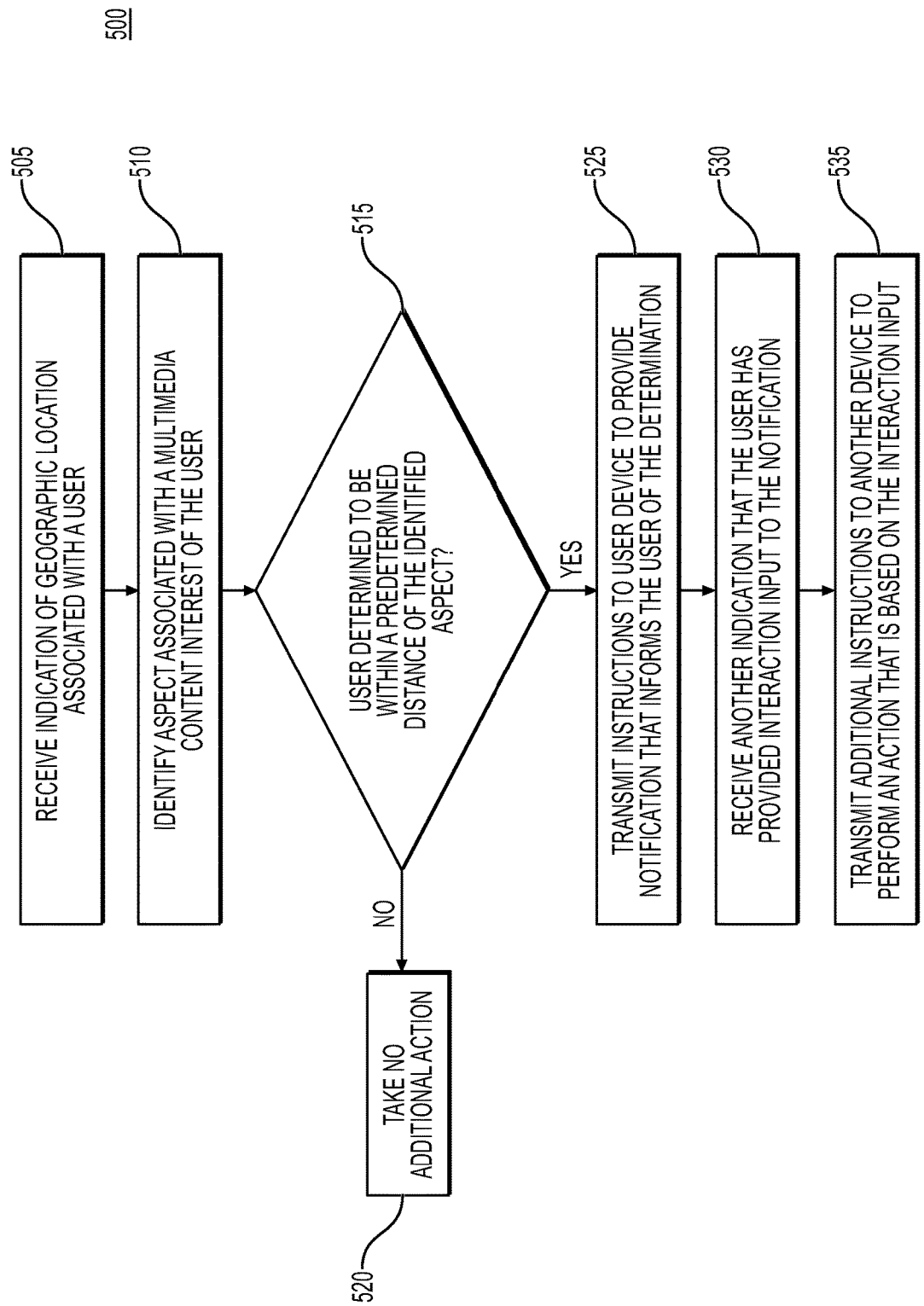
FIG. 5 depicts an exemplary flowchart of a method of causing another device to perform an action in association with a user's multimedia content interest, according to one or more embodiments.

Turning now to FIG. 5, an exemplary process flow 500 for enabling user inputs to a provided notification and thereafter facilitating interaction with another device based on the user inputs is provided according to one or more embodiments of the present disclosure. The exemplary process flow 500 may be implemented by system environment 100, which includes user computing device 105 associated with users, computer server 115, multimedia content preference database 120, and content delivery databases 125 (all shown in FIG. 1).

Steps 505-520 are similar to steps 205-220 described above with reference to FIG. 2 and are therefore not repeated herein.

Responsive to determining, at step 515, that the geographic location associated with the user is within the predetermined distance of the known location of an aspect of a multimedia content interest, an embodiment may, at step 525, transmit instructions to the user device 105 to provide an interactive notification to the user. More particularly, in addition to the provision of a visual notification that may inform the user that they are proximate to a multimedia content interest, as previously described with respect to step 225 and illustrated in FIGS. 3(A-D) and 4(A-B), the interactive notification provided at step 525 may be configured to allow the user to interact with the notification to provide additional instructions to the computer server 115. More particularly, the notification may contain a prompt and/or query along with one or more selection options that the user may interact with (e.g., via touch input, voice input, stylus input, etc.). In an embodiment, the computer server 115 may interact with one or more external sources in order to obtain the necessary information to form the prompt and/or the queries. For example, in the generation of a notification that informs the user that they are proximate to a haunted house that was featured in one of their multimedia content interests and that queries the user whether they would like to attend a tour, the computer server 115 may need access to a website or other informational source associated with the haunted house.

At step 530, an embodiment may receive another indication that the user has provided input to the interactive notification. In this regard, the computer server 115 may receive an indication that the user has selected one of the presented options displayed in the notification. In an embodiment, the computer server 115 may be configured to perform different functions based upon the option that was selected.

At step 535, an embodiment may transmit additional instructions to another device to perform an action that is based on the user selection in the notification. In this regard, the computer server 115 may interact with one or more other devices associated with the multimedia content interest in order to execute a command associated with the user's selection (e.g., make a reservation, order a ride, watch a multimedia article, share information with another device, open a communication channel with another device, and the like.)

Turning now to FIGS. 6-10, a variety of exemplary types of interactive notifications are illustrated. It is important to note that these types of interactive notifications are not limiting and other types of notification, not explicitly illustrated and described here, may also be generated by the computer server 115 and displayed on the user computing device 105.

Turning now to FIG. 6A, the computer server 115 may identify that a user is in proximity to a haunted house that was featured in a show they recently watched. The computer server 115 may be able to access visitation information (e.g., pricing information, tour times, etc.) from a website associated with the haunted house. Thereafter, a notification 600A may be provided to the user that informs them that tours are being offered at $20 per person for this haunted house. Additionally, the notification 600A may further query the user if they would be interested in reserving a spot in one of the upcoming tours and provide them with a confirm option 605 or a decline option 610. Responsive to detecting that a user has selected the confirm option 605, a new notification 600B (as illustrated in FIG. 6B) may be provided to the user that provides them with a set of upcoming tour times 615. Responsive to receiving a user selection on one of the upcoming tour times 615, the computer server 115 may communicate with the system associated with the haunted house website to reserve a tour date. In this regard, the computer server 115 may utilize stored financial information associated with the user (e.g., a payment vehicle, such as a credit card, designated by the user to be utilized by the computer server 115 to perform certain transactions, etc.) to facilitate payment for the tour.

Figure 7B:
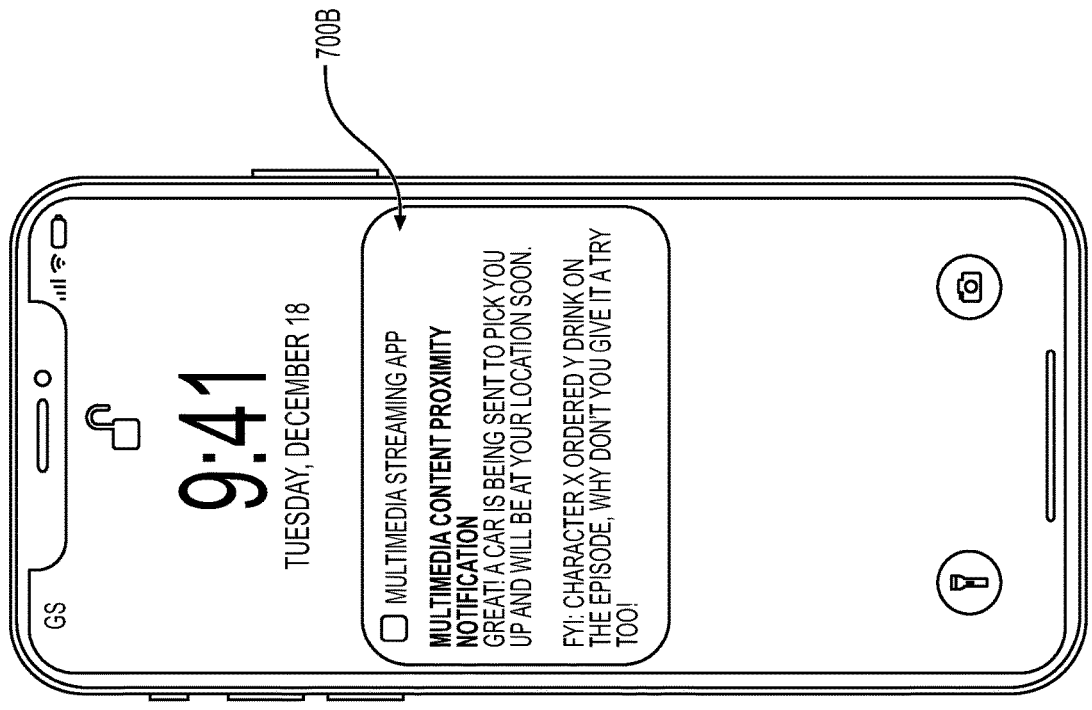
FIG. 7(A-B) depicts exemplary push notifications and interactions therewith, according to one or more embodiments.
Figure 7A:
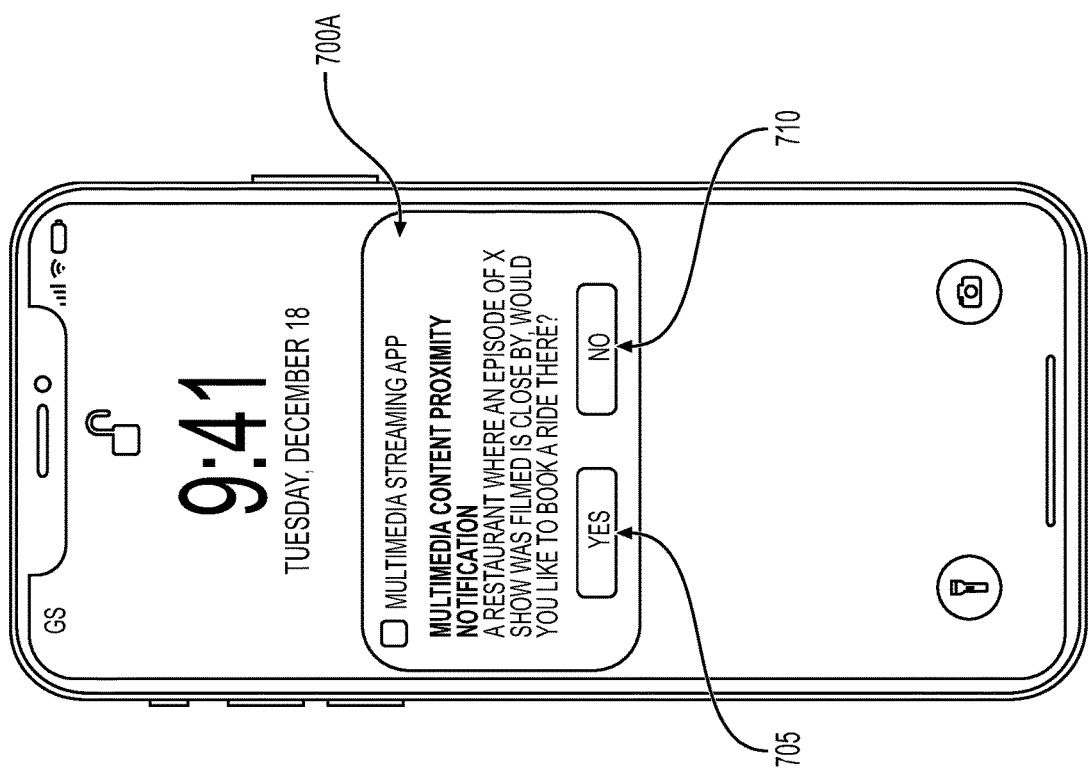

Turning to FIG. 7(A-B), the computer server 115 may identify that a user is in proximity to a restaurant that was featured in an episode of a show they had previously watched. The computer server 115 may be able to access transport information (e.g., by communicating with one or more available ridesharing platforms, public transport services, etc.) in the user's geographic location. Thereafter, the computer server 115 may provide a notification 600A (as illustrated in FIG. 7A) to the user that informs them of the proximate presence of the restaurant. Additionally, the notification 700A may also contain a query asking the user if they would like to arrange transport to the restaurant. A user may respond to this query by selecting a confirm option 705 or a decline option 710. Responsive to detecting that a user has selected the confirm option 605, the computer server 115 may attempt to arrange travel for them. In this regard, the computer server 115 may first determine whether the user has designated any preconfigured preferences for travel arrangement. For example, the computer server 115 may determine whether the user has authorized the computer server 115 to engage any local ride sharing service, taxi company, or the like, to facilitate travel. If the computer server 115 determines that no preconfigured preferences exist, then another query notification may be provided requesting the user to confirm how they would like to arrange travel to the restaurant. In the exemplary implementation illustrated in FIG. 7B, the user has preconfigured travel preferences and the computer server 115, in response to detection of user selection of the confirm option 705 in FIG. 7A, may provide the user with a new notification 700B that informs the user that a ride will be there soon to pick them up. Additionally, the new notification 700B may also contain an indication of a drink that a character featured in the show tried when they were at the restaurant and may recommend the user to try it as well.

Turning now to FIG. 8(A-B), the computer server 115 may provide options for a user to share the information they were apprised of with friends and/or store this information in a database for future consideration. For instance, with reference to FIG. 8A, the computer server 115 may identify that a restaurant that was featured in a show a user previously watched is located close by. The computer server 115 may provide a notification 800A that informs the user of this fact and that may also query the user if they want to share this information with one or more of their friends (e.g., their phone contacts, their social media contacts, etc.). Responsive to detecting selection of a confirm option 805, rather than a decline option 810, the computer server 115 may share the notification information with known user devices associated with one or more predetermined contacts (as designated by the user) or, in the absence of any predetermined contacts, may provide a user with a list of available contacts to choose from to send the information to (not illustrated). In another embodiment, with reference to FIG. 8B, the computer server 115 again may identify that a restaurant that was featured in a show a user previously watched is located close by. In this situation, the computer server 115 may provide a notification 800B that informs the user of this fact and that may also query the user if they want to add the location associated with the restaurant to a "bucket list" (i.e., a specific data store). Responsive to detecting selection of a confirm option 815, rather than a decline option 820, the computer server 115 may save this location information to the designated bucket list data store.

Turning now to FIG. 9(A-B), the computer server 115 may query the user whether they would like to watch an article of multimedia content that is associated with the multimedia content interest. For instance, with reference to FIG. 9A, the computer server 115 may identify that a restaurant that was featured in an episode of a show the user previously watched is located close by. The computer server 115 may provide a notification 900A that contains a query that asks the user whether they would like to watch the episode associated with the multimedia content interest. A user may respond to this query by selecting a confirm option 905 or a decline option 910. Responsive to detecting that a user has selected the confirm option 905, the computer server 115 may interact with a content delivery database (e.g., stored on another device, etc.) to obtain the relevant article of multimedia content and thereafter transmit instructions to the user computing device 105 to display, as illustrated in 900B, the article of multimedia content on a corresponding display.

Figure 10B:
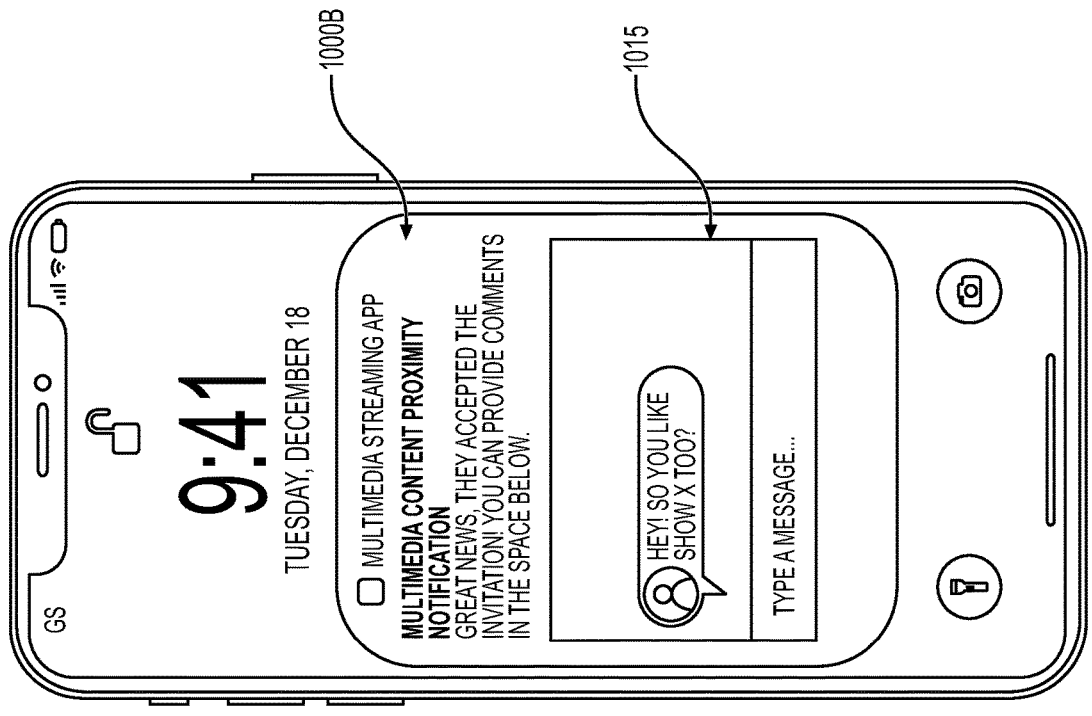
FIG. 10(A-B) depicts exemplary push notifications and interactions therewith, according to one or more embodiments.
Figure 10A:
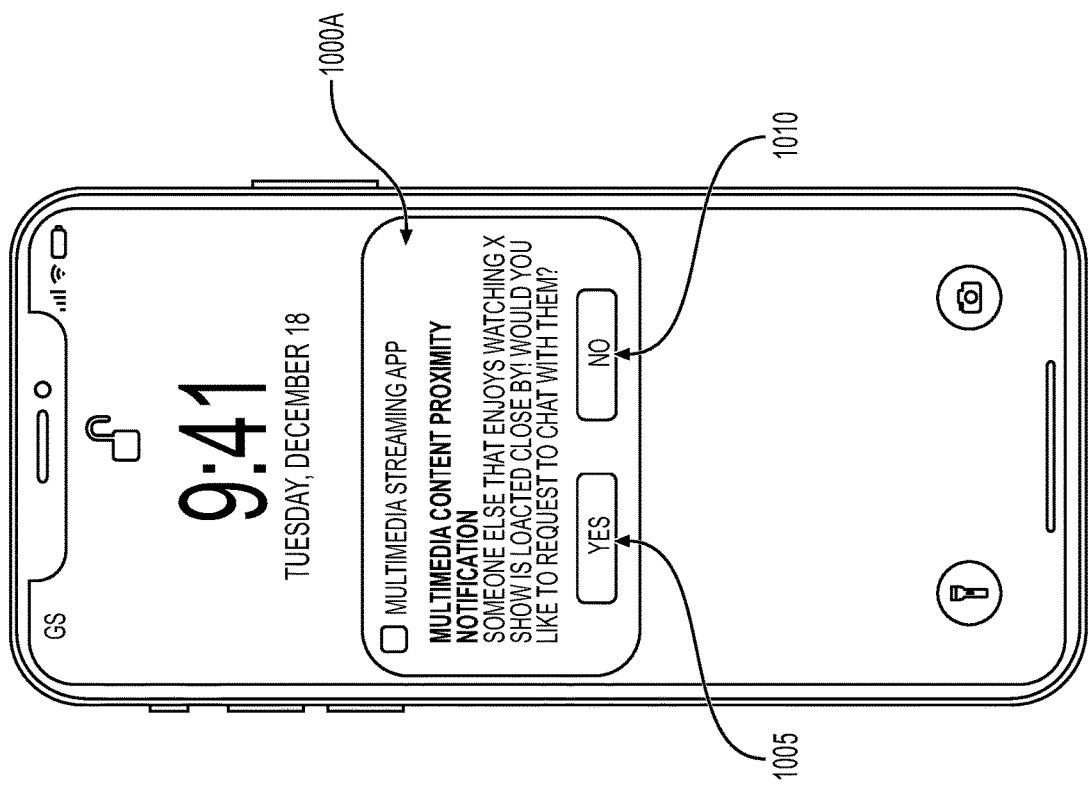

Turning now to FIG. 10(A-B), the computer server 115 may identify other proximately-located individuals that share the same multimedia content interest as the user and query the user whether they would like to interact with those other individuals. In the context of this application, other proximately-located individuals may correspond to those other individuals that: A) are subscribed to the same multimedia streaming platform as the user; B) share one or more multimedia content interests with the user; and C) may be within a predetermined distance of the user (e.g., within a predetermined mileage distance, within the same city, within the same county, etc.). In an optional embodiment, the proximately-located individual may also be one that must be proximate to the same multimedia content interest that the user is proximate to. As a non-limiting example of the foregoing, the computer server 115 may provide a notification 1000A that contains an indication that a proximately-located individual has been identified. The notification 1000A may further prompt the user whether they would like to initiate a chat with this other individual and may provide a confirm option 1005 and a decline option 1010 for the user to select from. Responsive to detecting that the user has selected the confirm option 1005, the computer server 115 may interact with a known user device associated with the proximately-located individual to request initiation of a chat. Responsive to identifying that the request has been approved by the known user device associated with the proximately-located individual, the computer server 115 may transmit instructions to the user computing device 105 to update, as shown in FIG. 10B, the notification 1000B. The updated notification 1000B may include an indication that the user's request was accepted and may also include an integrated chat box that the user may provide input to in order to communicate with the other proximately located individual.

A variety of different types of notifications, and the structures, content, and functionality associated therewith, were previously disclosed. The characteristics associated with each notification type may be presented alone, or in combination, with the characteristics of any other foregoing notification type. Furthermore, it should be understood that previously disclosed embodiments are exemplary only, and that other embodiments may include various combinations of features from other embodiments, as well as additional or fewer features.

In general, any process discussed in this disclosure that is understood to be computer-implementable, such as the process illustrated in FIG. 2, may be performed by one or more processors of a computer server, such as computer server 115, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer server. A processor may be a central processing unit (CPU), a graphics processing unit (GPU), or any suitable types of processing unit.

A computer system, such as computer server 115, may include one or more computing devices. If the one or more processors of the computer system are implemented as a plurality of processors, the plurality of processors may be included in a single computing device or distributed among a plurality of computing devices. If a computer server 115 comprises a plurality of computing devices, the memory of the computer server 115 may include the respective memory of each computing device of the plurality of computing devices.

Figure 11:
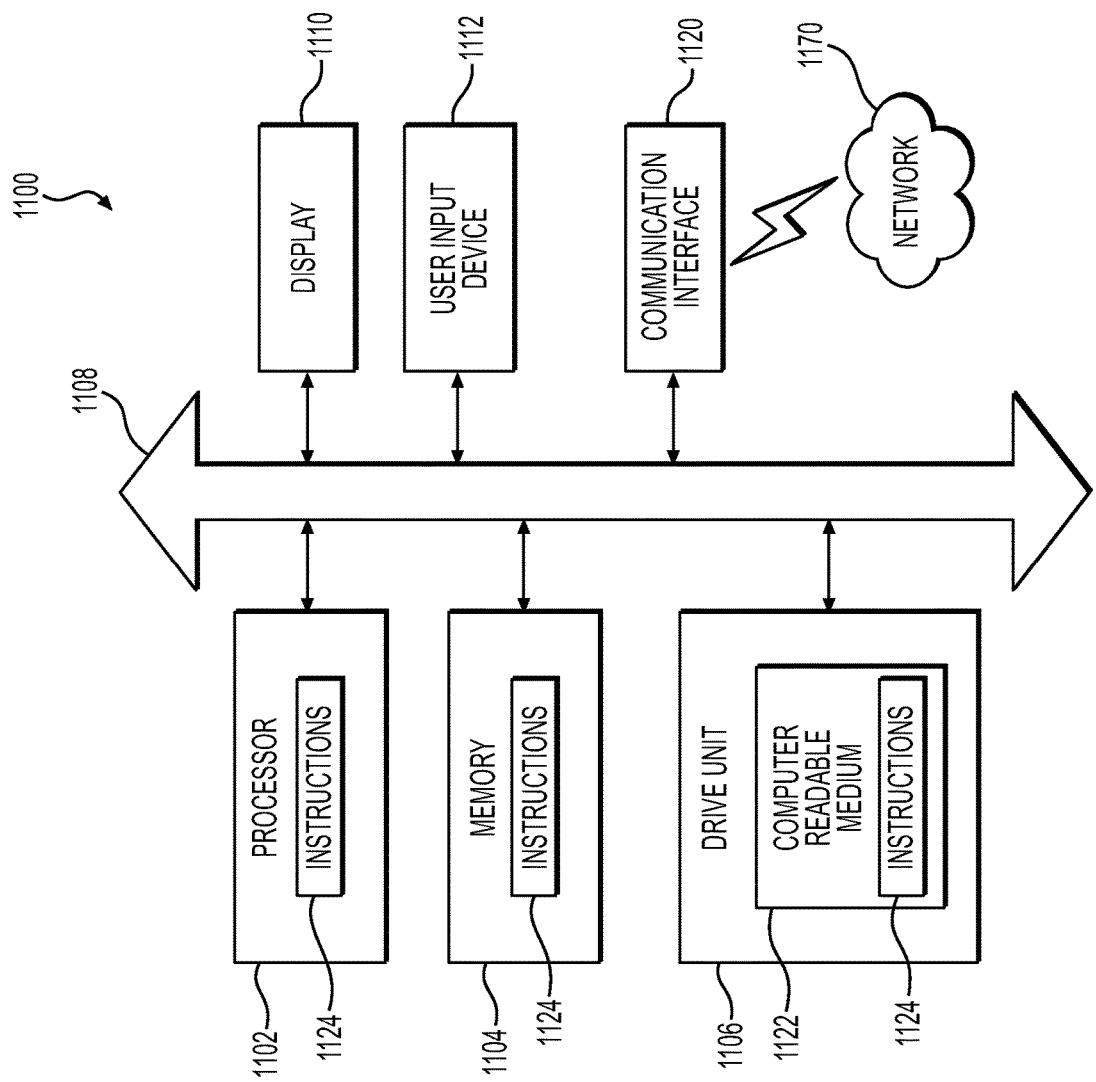
FIG. 11 depicts an exemplary computing server, according to one or more embodiments.

FIG. 11 is a simplified functional block diagram of a computer system 1100 that may be configured as a computing device for executing the processes illustrated in FIGS. 2 and 5, according to exemplary embodiments of the present disclosure. FIG. 11 is a simplified functional block diagram of a computer that may be configured as the computer server 115 according to exemplary embodiments of the present disclosure. In various embodiments, any of the systems herein may be an assembly of hardware including, for example, a data communication interface 1120 for packet data communication. The platform also may include a central processing unit ("CPU") 1102, in the form of one or more processors, for executing program instructions. The platform may include an internal communication bus 1108, and a storage unit 1106 (such as ROM, HDD, SDD, etc.) that may store data on a computer readable medium 1122, although the system 1100 may receive programming and data via network communications. The system 1100 may also have a memory 1104 (such as RAM) storing instructions 1124 for executing techniques presented herein, although the instructions 1124 may be stored temporarily or permanently within other modules of system 1100 (e.g., processor 1102 and/or computer readable medium 1122). The system 1100 also may include input and output ports 1112 and/or a display 1110 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to asynchronous consumption of streaming media, it should be appreciated that the presently disclosed embodiments may be applicable to transmitting data and may be applicable to any environment, such as a desktop or laptop computer, a gaming console environment, and any CTV (connected TV) environment (e.g., an internet-connected device used to watch multimedia content items), etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes shown in FIGS. 2 and 5, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for apprising a user of a proximately located aspect-of-interest using a server in network communication with at least one database, the method comprising operations including:
  receiving, at the server and from an application platform, an indication of a geographic location associated with the user;
  identifying, via accessing the at least one database, one or more aspects associated with a multimedia content interest of the user;
  determining, using the at least one processor, that the geographic location associated with the user is within a predetermined distance to a known location for at least one aspect of the one or more aspects associated with the multimedia content interest;
  ascertaining, using the at least one processor, another individual located proximate to the known location for the at least one aspect that is a subscriber to the application platform and that shares the multimedia content interest with the user;
  transmitting, responsive to determining that the geographic location associated with the user is within the predetermined distance to the known location for the at least one aspect of the one or more aspects associated with the multimedia content interest and responsive to the ascertaining, instructions to a user device associated with the user to provide a notification to the user, wherein the notification comprises a chat confirmation option to enable communication with the another individual and wherein the notification is a push notification provided to the user device when the application platform is not open on the user device;
  receiving, at the server, another indication that the user has selected the chat confirmation option via interaction with the notification;
  transmitting, by the server and responsive to identifying selection of the chat confirmation option, instructions to another user device associated with the another individual to display a chat initiation request; and
  transmitting, by the server and upon detecting an acceptance indication of the chat initiation request from the another user device, instructions to the user device to update the notification to contain an integrated chat box within the updated notification, wherein interaction with the integrated chat box enables the communication with the another user.

2. The method of claim 1, wherein the receiving the indication comprises receiving location-based context data associated with the user, wherein the location-based context data is derived from at least one of: calendar data, communication data, social media data, and location data for the user device.

3. The method of claim 1, wherein the multimedia content interest corresponds to one or more of: a favorited article of multimedia content by the user, a recently viewed article of multimedia content by the user, a frequently viewed article of multimedia content by the user, a friend-suggested article of multimedia content, and a popular article of multimedia content.

4. The method of claim 1, wherein the one or more aspects correspond to at least one of: a location where the multimedia content interest was filmed, a building that the multimedia content interest was filmed in, an event featured or mentioned in the multimedia content interest, a structure featured or mentioned in the multimedia content interest, an object featured or mentioned in the multimedia content interest, a person that was associated with the multimedia content interest, and other proximately-located individuals that share the multimedia content interest.

5. The method of claim 1, wherein the push notification is presented on a display screen of the user device and wherein the push notification comprises a message informing the user that the at least one aspect is proximate to the user.

6. The method of claim 1, wherein the another device is associated with one or more of: a business, an entity, and/or another individual.

7. A system for apprising a user of a proximately located aspect-of-interest, the system comprising:
　at least one processor;
　at least one database; and
　a server in network communication with the at least one database, the server configured to perform operations including:
　　receiving, at the server and from an application platform, an indication of a geographic location associated with the user;
　　identifying, via accessing the at least one database, one or more aspects associated with a multimedia content interest of the user;
　　determining, using the at least one processor, whether the geographic location associated with the user is within a predetermined distance to a known location for at least one aspect of the one or more aspects associated with the multimedia content interest;
　　ascertaining, using the at least one processor, another individual located proximate to the known location for the at least one aspect that is a subscriber to the application platform and that shares the multimedia content interest with the user;
　　transmitting, responsive to determining that the geographic location associated with the user is within the predetermined distance to the known location for the at least one aspect of the one or more aspects associated with the multimedia content interest and responsive to the ascertaining, instructions to a user device associated with the user to provide a notification to the user, wherein the notification comprises a chat confirmation option to enable communication with the another individual and wherein the notification is a push notification provided to the user device when the application platform is not open on the user device;
　　receiving, at the server, another indication that the user has selected the chat confirmation option via interaction with the notification;
　　transmitting, by the server and responsive to identifying selection of the chat confirmation option, instructions to another user device associated with the another individual to display a chat initiation request; and
　　transmitting, by the server and upon detecting an acceptance indication of the chat initiation request from the another user device, instructions to the user device to update the notification to contain an integrated chat box within the updated notification, wherein interaction with the integrated chat box enables the communication with the another user.

8. The system of claim 7, wherein the multimedia content interest corresponds to one or more of: a favorited article of multimedia content by the user, a recently viewed article of multimedia content by the user, a frequently viewed article of multimedia content by the user, a friend-suggested article of multimedia content, and a popular article of multimedia content.

9. The system of claim 7, wherein the one or more aspects correspond to at least one of: a location where the multimedia content interest was filmed, a building that the multimedia content interest was filmed in, an event featured or mentioned in the multimedia content interest, a structure featured or mentioned in the multimedia content interest, an object featured or mentioned in the multimedia content interest, a person that was associated with the multimedia content interest, and other proximately-located individuals that share the multimedia content interest.

10. The system of claim 7, wherein the receiving the indication comprises receiving location-based context data associated with the user, wherein the location-based context data is derived from at least one of: calendar data, communication data, social media data, and location data for the user device.

11. The system of claim 7, wherein the push notification is presented on a display screen of the user device and wherein the push notification comprises a message informing the user that the at least one aspect is proximate to the user.

12. The system of claim 7, wherein the another device is associated with one or more of: a business, an entity, and/or another individual.

13. A non-transitory computer-readable medium storing computer-executable instructions which, when executed by a server in network communication with at least one database, cause the server to perform operations comprising:
　receiving, at the server and from an application platform, an indication of a geographic location associated with the user;
　identifying, via accessing the at least one database, one or more aspects associated with a multimedia content interest of the user;
　determining, using the at least one processor, whether the geographic location associated with the user is within a predetermined distance to a known location for at least one aspect of the one or more aspects associated with the multimedia content interest;
　ascertaining, using the at least one processor, another individual located proximate to the known location for the at least one aspect that is a subscriber to the application platform and that shares the multimedia content interest with the user;

transmitting, responsive to determining that the geographic location associated with the user is within the predetermined distance to the known location for the at least one aspect of the one or more aspects associated with the multimedia content interest and responsive to the ascertaining, instructions to a user device associated with the user to provide a notification to the user, wherein the notification comprises a chat confirmation option to enable communication with the another individual and wherein the notification is a push notification provided to the user device when the application platform is not open on the user device;

receiving, at the server, another indication that the user has selected the chat confirmation option via interaction with the notification;

transmitting, by the server and responsive to identifying selection of the chat confirmation option, instructions to another user device associated with the another individual to display a chat initiation request; and transmitting, by the server and upon detecting an acceptance indication of the chat initiation request from the another user device, instructions to the user device to update the notification to contain an integrated chat box within the updated notification, wherein interaction with the integrated chat box enables the communication with the another user.

14. The non-transitory computer-readable medium of claim 13, wherein the receiving the indication comprises receiving location-based context data associated with the user, wherein the location-based context data is derived from at least one of: calendar data, communication data, social media data, and location data for the user device.

15. The non-transitory computer-readable medium of claim 13, wherein the multimedia content interest corresponds to one or more of: a favorited article of multimedia content by the user, a recently viewed article of multimedia content by the user, a frequently viewed article of multimedia content by the user, a friend-suggested article of multimedia content, and a popular article of multimedia content.

16. The non-transitory computer-readable medium of claim 13, wherein the one or more aspects correspond to at least one of: a location where the multimedia content interest was filmed, a building that the multimedia content interest was filmed in, an event featured or mentioned in the multimedia content interest, a structure featured or mentioned in the multimedia content interest, an object featured or mentioned in the multimedia content interest, a person that was associated with the multimedia content interest, and other proximately-located individuals that share the multimedia content interest.

17. The non-transitory computer-readable medium of claim 13, wherein the push notification is presented on a display screen of the user device and wherein the push notification comprises a message informing the user that the at least one aspect is proximate to the user.

18. The non-transitory computer-readable medium of claim 13, wherein the another device is associated with one or more of: a business, an entity, and/or another individual.

* * * * *